No. 666,166. Patented Jan. 15, 1901.
J. E. ULSH.
TIRE.
(Application filed June 13, 1900.)
(No Model.)
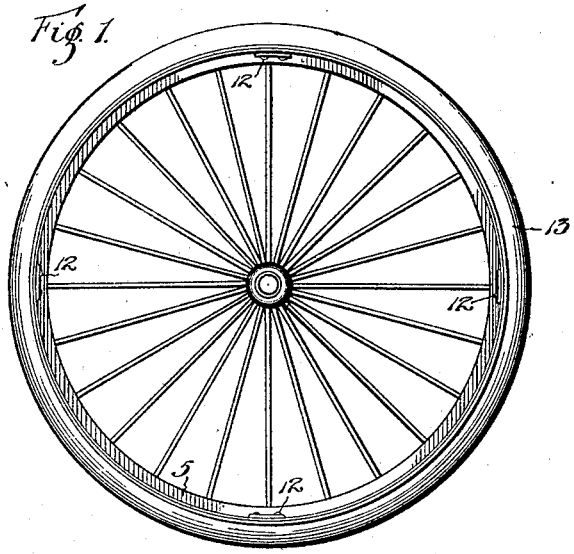
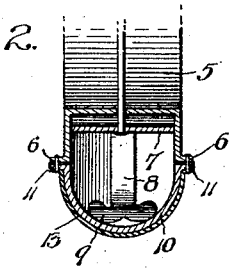
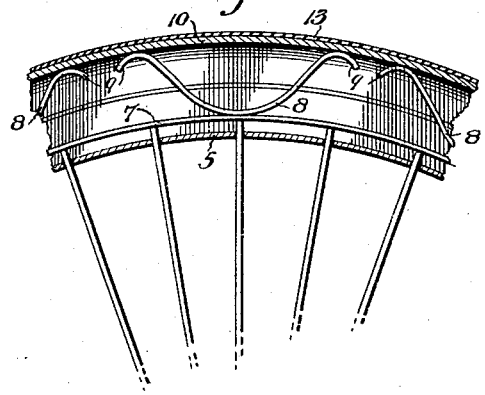
Witnesses
Ralph A. Shepard
E. A. Ryan
Inventor
J. E. ULSH.
by Chandlee & Chandlee
Attorneys
THE NORRIS PETERS CO., PHOTO-LITHO., WASHINGTON, D. C.

UNITED STATES PATENT OFFICE.

JOSEPH E. ULSH, OF ALTOONA, PENNSYLVANIA.

TIRE.

SPECIFICATION forming part of Letters Patent No. 666,166, dated January 15, 1901.

Application filed June 13, 1900. Serial No. 20,191. (No model.)

*To all whom it may concern:*

Be it known that I, JOSEPH E. ULSH, a citizen of the United States, residing at Altoona, in the county of Blair, State of Pennsylvania, have invented certain new and useful Improvements in Tires; and I do hereby declare the following to be a full, clear, and exact description of the invention, such as will enable others skilled in the art to which it appertains to make and use the same.

This inventon relates to vehicle-tires, and more particularly to that class known as "cushion-tires," the object of the invention being to provide a structure in which the tire of the wheel will be sustained in its extended position by means of springs and will thus be unaffected by puncture.

In the drawings forming a portion of this specification, in which like numerals of reference indicate similar parts in the several views, Figure 1 is a side elevation showing a wheel equipped with a tire constructed in accordance with this invention. Fig. 2 is a transverse section of a portion of the tire and the wheel-rim. Fig. 3 is a side elevation of the spring-supporting hook with the spring-fingers thereon.

Referring now to the drawings, 5 represents a casing surrounding the felly of a vehicle-wheel, said casing consisting of a hoop which is substantially U shaped in cross-section and the edges of the side portion of which are bent outwardly, as illustrated at 6. In the peripheral curve of this casing is disposed a metallic fully 7, upon the outer face of which are secured a number of compound-curved spring-fingers 8, which are oppositely disposed in pairs and the outer ends of which are curved inwardly, as shown at 9, the mutually-adjacent ends of these fingers being normally separated. A spring-metal sheath 10, which is in the form of an endless tube split along its inner periphery and having its edges bent outwardly, as shown at 11, is disposed to receive the fingers 8 under tension and is attached to the casing 5 by means of bolts or rivets passed through the corresponding edges 6 and 11 of the casing and sheath. This sheath 10 is formed in any number of arc-shaped sections, as illustrated in Fig. 1, the mutually-adjacent ends of these sections being connected by bolts 12 or in any other suitable manner, these bolts being passed through alining perforations in lugs upon the sections.

The sheath 10 has an external covering in the form of a rubber strip 13, corresponding in form thereto, but being endless, the edges of this rubber strip being attached to the outturned edges of the metallic sheath 10.

As illustrated in Fig. 2 of the drawings, the outer ends of the spring-fingers 8 are broadened transversely, so as to have an extended bearing against the inner surface of the metallic sheath 10, so that it may have a greater sustaining effect.

As illustrated in Fig. 1 of the drawings, the spokes of the wheel are passed through the web of the casing 5 and are engaged with the felly 7, any suitable number and style of spokes being employed.

With the above structure it will be seen that the weight upon the wheel in practice will act to compress the spring-fingers and that the elasticity of these fingers will have the effect of absorbing excessive vibration after the same manner as a pneumatic tire. Furthermore, the elastic strip will cause smooth moving of the wheel over slight obstructions, and the metallic sheath will efficiently protect the interior structure of the tire-frame from such obstructions as might otherwise injure the tire.

Having thus described my invention, what I claim is—

A vehicle-wheel comprising a casing including a U-shaped plate having its side edges bent outwardly, a felly disposed within the casing, a series of spring-fingers carried by the felly and extending outwardly therefrom, a metallic sheath upon the fingers, an elastic strip upon the metallic sheath and having its edges attached to the outturned edges of the felly, spokes passed through the casing and into the felly, and a hub connected with the spokes.

In testimony whereof I affix my signature in the presence of two witnesses.

JOSEPH E. ULSH.

Witnesses:
J. B. RAYMOND,
H. L. ULSH.